(12) United States Patent
Chen et al.

(10) Patent No.: US 10,399,197 B2
(45) Date of Patent: Sep. 3, 2019

(54) METHOD FOR CONFIRMING CUTTING TOOL'S LOCATION AND MACHINE SYSTEM USING THE SAME

(71) Applicant: INDUSTRIAL TECHNOLOGY RESEARCH INSTITUTE, Hsin-Chu (TW)

(72) Inventors: Chin-Ming Chen, Taichung (TW); Po-Hsiu Ko, Taichung (TW); Meng-Chiou Liao, Yulin County (TW); Szu-Chia Lin, Yilan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 111 days.

(21) Appl. No.: 15/856,670

(22) Filed: Dec. 28, 2017

(65) Prior Publication Data

US 2019/0176286 A1  Jun. 13, 2019

(30) Foreign Application Priority Data

Dec. 8, 2017 (TW) ............................. 106143231 A

(51) Int. Cl.
*B23Q 3/15* (2006.01)
*B23Q 17/09* (2006.01)
(Continued)

(52) U.S. Cl.
CPC ....... *B23Q 17/099* (2013.01); *B23Q 3/15546* (2013.01); *G05B 2219/31095* (2013.01);
(Continued)

(58) Field of Classification Search
CPC .......... G05B 2219/31095; G05B 2219/49304; G05B 2219/50338; G05B 2219/33192; B23Q 3/15546; B23Q 17/099
(Continued)

(56) References Cited

U.S. PATENT DOCUMENTS

RE32,837 E  1/1989 Corni
6,138,058 A  10/2000 Van Antwerp, Jr. et al.
(Continued)

FOREIGN PATENT DOCUMENTS

CN  105382607 A  3/2016
CN  105397546 A  3/2016
(Continued)

OTHER PUBLICATIONS

Wenping Du et al., 2D Barcode Identification Technology Application in Tool Management System for Workshop, Materials Science Forum, 2016, vols. 836-837, pp. 283-289.
(Continued)

*Primary Examiner* — Michael J Brown
(74) *Attorney, Agent, or Firm* — Tim Tinkang Xia, Esq.; Locke Lord LLP

(57) ABSTRACT

A method for confirming cutting tool's location includes: a position calculation unit basing on plural sleeve positions in a tool magazine to train and obtain training posture data and training signal strength data of each the sleeve position; and the position calculation unit sending a tool call command to move a target cutting tool among the cutting tool to a tool exchange position. The latter step includes: obtaining a posture data and a signal strength data of the target cutting tool; based on the posture data and the signal strength data, the position calculation unit comparing the training posture data and the training signal strength data to confirm a target sleeve location of the target cutting tool; and, rotating the tool magazine to move the target cutting tool from the target sleeve location to the tool exchange position. In addition, a machine system using the method is also provided.

10 Claims, 5 Drawing Sheets

(51) Int. Cl.
*B23Q 3/155* (2006.01)
*G05B 19/40* (2006.01)
*B23Q 17/24* (2006.01)

(52) U.S. Cl.
CPC .............. *G05B 2219/33192* (2013.01); *G05B 2219/49304* (2013.01); *G05B 2219/50338* (2013.01)

(58) Field of Classification Search
USPC .................................................. 700/160, 166
See application file for complete search history.

(56) References Cited

U.S. PATENT DOCUMENTS

| | | | |
|---|---|---|---|
| 7,289,873 | B2 | 10/2007 | Redecker et al. |
| 7,518,511 | B1 | 4/2009 | Panja et al. |
| 7,913,533 | B2 | 3/2011 | Lee et al. |
| 2008/0082200 | A1* | 4/2008 | Ikeda .................. G05B 19/406 700/160 |
| 2009/0234490 | A1 | 9/2009 | Suprock et al. |
| 2014/0148939 | A1* | 5/2014 | Nakano .............. G01B 11/2545 700/166 |

FOREIGN PATENT DOCUMENTS

| | | |
|---|---|---|
| CN | 105750971 A | 7/2016 |
| CN | 106113096 A | 11/2016 |
| CN | 106141811 A | 11/2016 |
| EP | 0214666 B1 | 9/1991 |
| EP | 1339014 A1 | 8/2003 |
| EP | 3184237 A1 | 6/2017 |
| TW | M447521 | 2/2013 |
| TW | M512462 U | 11/2015 |
| TW | M542541 | 6/2017 |
| TW | 201738030 A | 11/2017 |

OTHER PUBLICATIONS

R. Teti et al., Advanced monitoring of machining operations, CIRP Annals-Manufacturing Technology, 2010, 59, pp. 717-739.

Xiulin Sui et al., Design of Tool Automatic Identification and Database Management System Based on RFID, International Journal of Database Theory and Application, 2014, vol. 7, No. 5, pp. 133-144.

Chris A. Suprock, Making Smarter Tools, Sensors Magazine, 2008.

Cole Doupe et al., Optimal Attitude Control of Agile Spacecraft Using Combined Reaction Wheel and Control Moment Gyroscope Arrays, AIAA Modeling and Simulation Technologies Conference, AIAA SciTech Forum, 2015.

M. B. Salleh et al., Three-Axis Attitude Control Performance of a Small Satellite Using Control Moment Gyroscope, Applied Mechanics and Materials, 2014, vol. 629, pp. 286-290.

Christopher Adam Suprock, Wireless Sensor Integrated Tool for Characterization of Machining Dynamics in Milling, University of New Hampshire, ProQuest Dissertations, 2011.

Intellectual Property Office Ministry of Economic Affairs, R.O.C., Office Action, dated Jun. 20, 2018, Taiwan.

* cited by examiner

METHOD FOR CONFIRMING CUTTING TOOL'S LOCATION AND MACHINE SYSTEM USING THE SAME

CROSS REFERENCE TO RELATED APPLICATION

This application claims the benefits of Taiwan application Serial No. 106143231, filed on Dec. 8, 2017, the disclosures of which are incorporated by references herein in its entirety.

TECHNICAL FIELD

The present disclosure relates in general to a method for confirming cutting tool's location and a machine system using the method.

BACKGROUND

In a conventional numerical control (NC) machine, a tool magazine is used to store cutting tool required for an entire machining process, and also to displace the cutting tool for the next work order to a tool exchange position. In the usage of the tool magazine and the tool exchange apparatus of the numerical control machine, it is seldom seen but possible that people misplace the cutting tool or codes of cutting tool do not match those programmed for the tool magazine. Any of which would lead to a potential jeopardy further to damage the machine. In the current art, a reader is applied to the tool exchange point, so that, while in exchanging the cutting tool, the reader can tell data in a chip on the cutting tool so as to determine if a correct cutting tool is chosen. However, in the case that the reader determines fault cutting tool, human labor is still needed to correct this situation by, for example, resetting the machine or replacing the cutting tool. Obviously, additional human work involves in an automatic machining process is definitely time and labor consuming. Further, a qualified worker for executing the aforesaid resetting or replacing shall be experienced in machining programs, machine structures, control schemes, cutting tool replacing procedures and so on. Hence, to stand by a qualified worker, while running the auto machine, for a possible need in machine resetting or tool replacement is apparently less economic.

Thus, an improvement to confirm the usage of a correct cutting tool simply and effectively so as to avoid the aforesaid problems is definitely urgent to the skill in the related art.

SUMMARY

In this disclosure, a method for confirming cutting tool's location and a machine system using the method are provided to have a position of cutting tool easy to be obtained and confirmed, such that the aforesaid shortcoming of tool mis-placement in the tool magazine can be resolved, and the confirmation upon a correct cutting tool for a next work can be quickly performed.

In one embodiment of this disclosure, the method for confirming cutting tool's location includes: a step of a position calculation unit basing on a plurality of sleeve positions in a tool magazine to train and obtain a training posture data and a training signal strength data of each of the plurality of sleeve positions; and, a step of the position calculation unit sending a tool call command to move a target cutting tool among a plurality of cutting tool to a tool exchange position. The latter step further includes the steps of: obtaining a posture data and a signal strength data of the target cutting tool; basing on the posture data and the signal strength data of the target cutting tool, the position calculation unit comparing the training posture data and the training signal strength data so as to confirm a target sleeve location of the target cutting tool; and, rotating the tool magazine to move the target cutting tool from the target sleeve location to the tool exchange position.

In one embodiment of this disclosure, the machine system includes a position calculation unit, a tool magazine and a controller. The position calculation unit further includes a signal transceiver module and a data calculation module coupled with the signal transceiver module. The tool magazine has a plurality of sleeve positions, each of the plurality of sleeve positions has a cutting tool, and the cutting tool communicates with the position calculation unit via radio signals. The controller connects the tool magazine and the position calculation unit, and stores a machining program. The position calculation unit sends a tool call command to the controller so as to update the machining program for the tool magazine to follow, and the tool magazine bases on the tool call command to move a target cutting tool among the cutting tool to a tool exchange position. The latter step further includes the step of: the signal transceiver module receiving an inertial sensing coordinate and a radio signal generated by the target cutting tool, and transmitting the inertial sensing coordinate and the radio signal to the data calculation module so as to generate the posture data and the signal strength data of the target cutting tool; the data calculation module basing on the posture data and the signal strength data of the target cutting tool to compare a plurality of training posture data and a plurality of training signal strength data so as to confirm a target sleeve location of the target cutting tool; and, rotating the tool magazine by the controller to move the target cutting tool from the target sleeve location to the tool exchange position.

As stated above, in the method for confirming cutting tool's location and the machine system using the method provided by this disclosure, the operator can perform the tool exchange simply with only the knowledge of the cutting tool for the next work order, not necessary to have the understanding of the exact storage position of the cutting tool. Hence, even the cutting tool are randomly loaded into the tool magazine, it can still locate and retrieve the target cutting tool easily from the exact cutting tool's location in the tool magazine by analyzing the posture data and the signal strength data fed back by the cutting tool itself.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
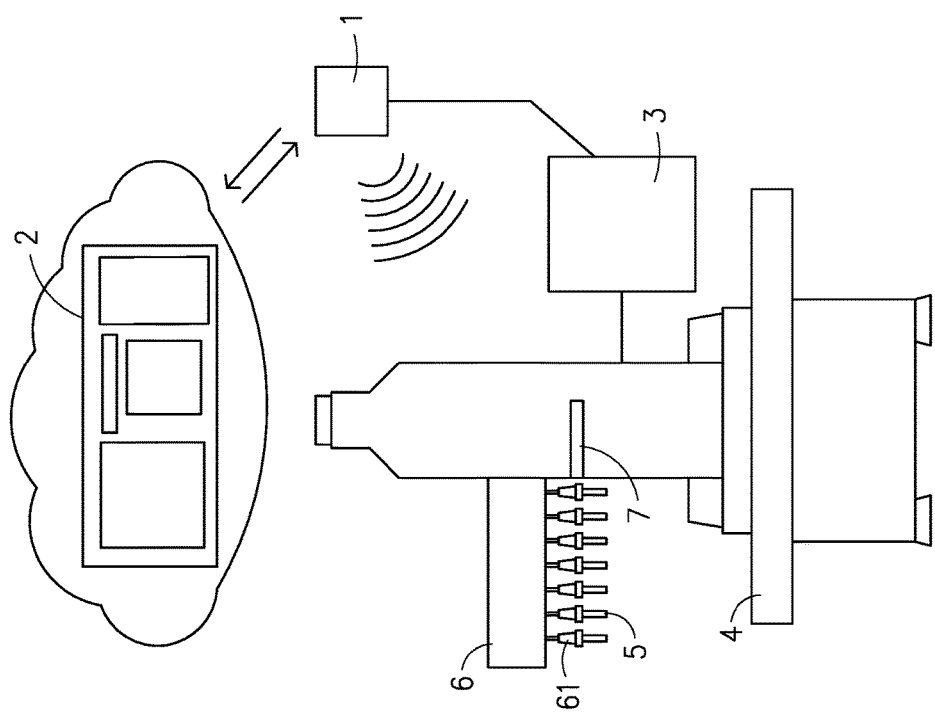
FIG. 1 is a schematic view of an embodiment of the machine system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, an embodiment of the machine system 10 in this disclosure includes a position calculation unit 1, a database unit 2, a controller 3, a machine 4, a plurality of cutting tool 5, a tool magazine 6 and a tool-exchange arm 7. The machine 4 can be a milling machine, a drilling machine, a lathe, a sawing machine, or the like machine, and the machine 4 can be furnished with or connected with the tool magazine 6 and the tool-exchange arm 7. The tool magazine 6 has a plurality of sleeve positions 61, and each of the sleeve positions 61 can contain a cutting tool 5. The cutting tool 5 can be a milling cutter, a drill bit, a lathe tool, a saw blade or the like cutting tool relevant to the machine 4. The controller 3 can be a personal computer (PC), a programmable logic controller (PLC) or the like control unit. The controller 3 has a machining program for the machine 4 to control the cutting tool 5 on the spindle to machine a workpiece. Also, the tool magazine 6 can base on the machining program to perform tool exchange. While in exchanging the cutting tool 5, the tool magazine 6 is firstly rotated to turn the cutting tool 5 to be used in the next work order to the predetermined tool exchange position, then the tool-exchange arm 7 would download the current cutting tool 5 from the spindle, and then the cutting tool 5 for the coming work order would be uploaded to the spindle. The downloaded cutting tool 5 for the previous work order would be shifted to a corresponding sleeve position 61 in the tool magazine 6 by the tool-exchange arm 7.

Figure 2:
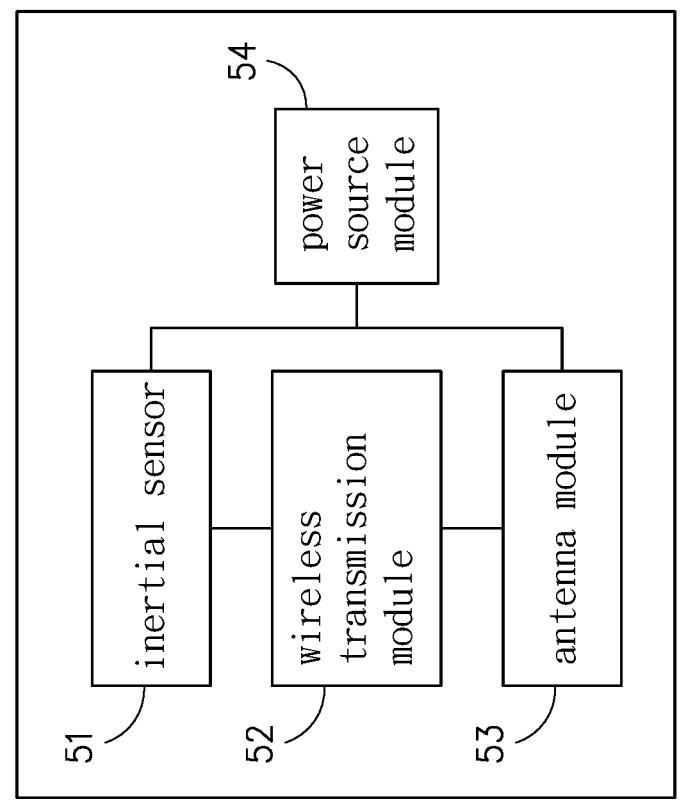
FIG. 2 is a schematic block view of the cutting tool in accordance with this disclosure.

In this embodiment, the cutting tool 5 as shown in FIG. 2 includes an inertial sensor 51, a wireless transmission module 52, an antenna module 53 and a power source module 54. The inertial sensor 51 can be a gyroscope for detecting a posture of the cutting tool 5 so as thereby to produce a corresponding three-dimensional inertial sensing coordinate. The inertial sensor 51 is coupled with the wireless transmission module 52. In this embodiment, the wireless transmission module 52 has a wireless sensor network (WSN), which can apply, but not limited to, Zigbee to fulfill the wireless transmission. In another embodiment, the wireless transmission module 52 can apply Bluetooth, Wi-Fi or NFC to fulfill the wireless transmission. The antenna module 53, coupled with the wireless transmission module 52, includes an antenna provided in correspondence with a protocol of the wireless transmission module 52. The aforesaid inertial sensor 51, wireless transmission module 52 and antenna module 53 are individually coupled with the power source module 54, so that the power source module 54 can energize the inertial sensor 51, the wireless transmission module 52 and the antenna module 53. In one embodiment, the power source module 54 can include a chargeable battery so as to make the power source module 54 a wireless charging device.

Referring back to FIG. 1, the position calculation unit 1 can be fulfilled by hardware (for example, a micro processor, a directed wireless station and the like), software (for example, programmed commands for the processor to follow), or a combination of hardware and software. The position calculation unit 1 is coupled with the controller 3 in a wireless or cabling manner. In details, referring to FIG. 3, the position calculation unit 1 includes a signal transceiver module 11 and a data calculation module 12. The signal transceiver module 11 is coupled with the data calculation module 12. The position calculation unit 1 uses the signal transceiver module 11 to transmit programmed commands to the controller 3, such that the machining program can be updated. The data calculation module 12 can be a microcontroller (MCU) for data calculation. On the other hand, the tool magazine 6 communicates the position calculation unit 1 by radio signals, or the position calculation unit 1 connects each of the cutting tool 5 by radio signals. Thereupon, the inertial sensor 51 detects individual postures of all the cutting tool 5 so as to generate corresponding three-dimensional inertial sensing coordinates. These three-dimensional inertial sensing coordinates are transmitted to the signal transceiver module 11 of the position calculation unit 1 by the wireless transmission module 52, so that individual posture data of the cutting can be obtained. Then, the signal transceiver module 11 would transmit the posture data to the data calculation module 12. In addition, the data calculation module 12 would base on an RSSI (Received signal strength indication) value of the radio signal issued by the cutting tool 5 to generate corresponding signal strength data of the cutting tool 5. By evaluating the signal strength data, a related distance between each the cutting tool 5 and the position calculation unit 1 can be determined.

The database unit 2, coupled to the position calculation unit 1, can be fulfilled by hardware (for example, an IC), software (for example, programmed commands executed by a processor) or a combination of aforesaid two). In this embodiment, the database unit 2 can be a cloud-end server. The position calculation unit 1 can apply the signal transceiver module 11 to undergo the cloud-end data transmission with the database unit 2. In another embodiment, the position calculation unit 1 can include the database unit 2 as an internal database of the position calculation unit 1. In this embodiment, the database unit 2 can store the cutting tool data, the posture data and the signal strength data, in which the cutting tool data include codes, websites, lengths, diameters, abrasiveness and/or service life of the cutting tool. In this embodiment, the signal transceiver module 11 in the position calculation unit 1 can transmit the cutting tool data, the posture data and the signal strength data to the data calculation module 12. On the other hand, if there exist updated cutting tool data, updated posture data and updated signal strength data of cutting tool 5, the signal transceiver module 11 in the position calculation unit 1 can be applied to transmit and thus update these cutting tool data, posture data and/or signal strength data to the database unit 2.

Figure 3:
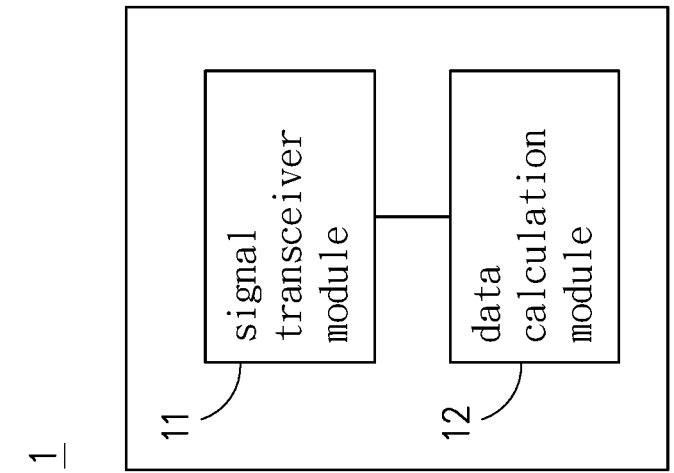
FIG. 3 is a schematic block view of the position calculation unit in accordance with this disclosure.
Figure 4:
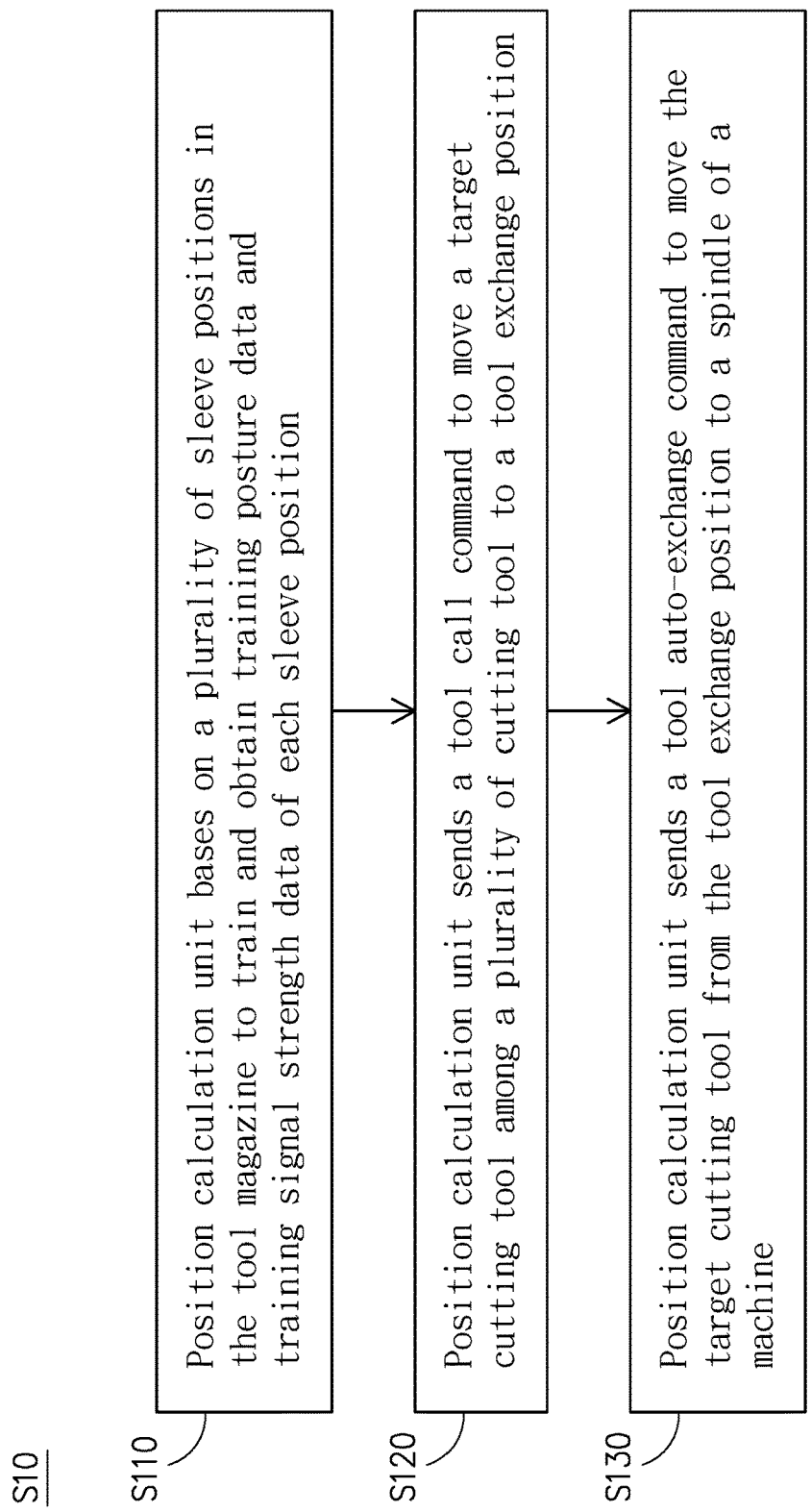
FIG. 4 is a schematic flowchart of an embodiment of the method for confirming cutting tool's location in accordance with this disclosure.

In this embodiment, upon the aforesaid arrangement of the machine system 10, referring to FIG. 4 by accompanying FIG. 1 through FIG. 3, the method for confirming cutting tool's location S10 includes Step S110 to Step S130 as follows. In Step S110, a position calculation unit 1 is applied to base on a plurality of sleeve positions 61 in a tool magazine 6 to train and obtain training posture data and training signal strength data of each the sleeve position 61. The signal transceiver module 11 is then applied to transmit the training posture data and the training signal strength data of each the sleeve position 61 to the data calculation module 12. On the other hand, the signal transceiver module 11 also transmits the training posture data and the training signal strength data of each the sleeve position 61 to the database unit 2.

Figure 5:
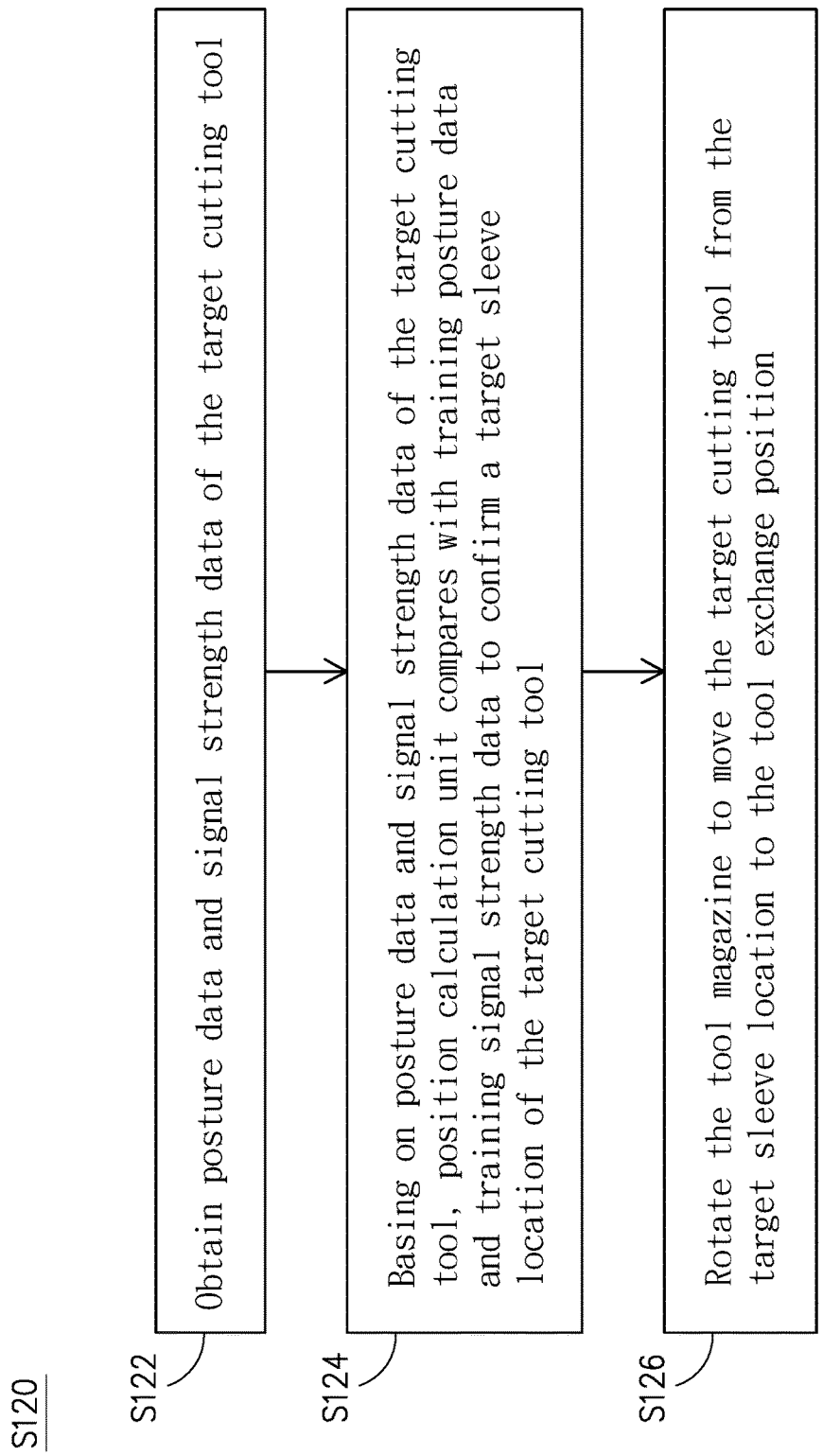
FIG. 5 is a schematic flowchart of sending a tool call command in accordance with this disclosure.

After the training posture data and the training signal strength data of each the sleeve position 61 are obtained in Step S110, in Step S120, the position calculation unit 1 sends a tool call command to the controller 3 to update the machining program for the tool magazine 6 to follow. The tool magazine 6 bases on the tool call command to move a target cutting tool among a plurality of cutting tool 5 to a tool exchange position. It shall be explained that the tool call command herein is a T command in the machining program, a T code (consisted of a letter T and a following number with two digits) in the T command stands for a specific cutting tool function, and the number following letter T stands for the cutting tool code for the next work order (i.e., the target cutting tool). In details, by referring to FIG. 5, to execute the tool call command of Step S120, Step S122 to Step S126 are performed. In Step S122, the posture data and the signal strength data of the target cutting tool are obtained firstly. As described above, while in calling a specific cutting tool, since each the cutting tool 5 has the inertial sensor 51 and the wireless transmission module 52, the signal transceiver module 11 of the position calculation unit 1 would receive a radio signal generated by the target cutting tool, and the radio signal would be then forwarded to the data calculation module 12. The data calculation module 12 would base on a received signal strength of the radio signal from the target cutting tool to generate corresponding signal strength data of the target cutting tool. For the signal strength data can be analyzed to obtain a related distance between the target cutting tool and the position calculation unit 1, thus the position calculation unit 1 can base on the signal strength data of the target cutting tool to judge if or not the target cutting tool is in the tool magazine 6. Then, if the target cutting tool is in the tool magazine 6, the inertial sensor 51 would detect the posture of the target cutting tool, and the signal transceiver module 11 would receive the three-dimensional inertial sensing coordinate generated by the target cutting tool, and then transmit the three-dimensional inertial sensing coordinate to the data calculation module 12. The data calculation module 12 would base on the three-dimensional inertial sensing coordinate to produce an initial posture data. Then, the tool magazine 6 is rotated to change the posture of the target cutting tool, and a corresponding moving posture data of this target cutting tool is obtained. In details, according to the type of the tool magazine 6, the controller 3 would order the tool magazine 6 to rotate a unit movement so as to change the posture of the target cutting tool. For example, if the tool magazine 6 is a round tool magazine, a movement of the tool magazine 6 would be enough to change the posture of the cutting tool 5. In another example, if the tool magazine 6 is a rectangular or square tool magazine, it is understood that some movement of the tool magazine 6 may not be able to change the posture of the cutting tool (for example, a simple horizontal or vertical movement). In this situation, only the movement of the tool magazine 6 includes a corner turning, and then the posture of the cutting tool 5 can be altered. Thereupon, the tool magazine 6 would need to be set to move K+1 movement, in which K is the maximal value in the dimensions (length, width and height) of the rectangular or square tool magazine. After the moving posture data of the target cutting tool is obtained, then the data calculation module 12 of the position calculation unit 1 would base on differences between the moving posture data and the initial posture data to obtain the corresponding posture data.

In addition, while the position calculation unit 1 sends the tool call command, the signal transceiver module 11 would retrieve the training signal strength data and the training posture data from the database unit 2 and forward to the data calculation module 12. Then, in Step S124, the data calculation module 12 would base on the posture data and the signal strength data of the target cutting tool to process comparisons with the corresponding training posture data and training signal strength data, such that a target sleeve location of the target cutting tool can be confirmed. Hence, in this embodiment, Step S110 is performed to train and obtain the training posture data and the training signal strength data of each the sleeve position 61. To confirm the target sleeve location of the target cutting tool, the training posture data and the training signal strength data of each the sleeve position 61 would be compared with the instant posture data and signal strength data provided by the target cutting tool, such that the specific sleeve position 61 in the tool magazine 6 containing the target cutting tool can be confirmed. Upon such an arrangement, the operator can perform the tool exchange simply with only the knowledge of the cutting tool 5 for the next work order, not necessary to have the understanding of the exact storage position of the cutting tool 5. Contrary to the conventional method that utilizes fixed tool numbers, even in a situation of randomly loading the cutting tool 5 into the tool magazine 6, the method for confirming cutting tool's location S10 in accordance with this disclosure can still locate and retrieve the target cutting tool 5 easily from the exact cutting tool's location in the tool magazine 6 by analyzing the posture data and the signal strength data fed back by the cutting tool 5 itself.

After Step S124 is performed to confirm the target sleeve location of the target cutting tool, the data calculation module 12 of the position calculation unit 1 can calculate both the distance between the target sleeve location and the tool exchange position and the movement required for the tool magazine 6 to move. Then, in Step S126, the tool magazine 6 is rotated to shift the target cutting tool from the target sleeve location to the tool exchange position. Since the position of the cutting tool 5 is already understood and the cutting tool 5 has been shifted to the tool exchange position, thus it is unnecessary to rotate the tool magazine 6 to the tool exchange position before the cutting tool is confirmed. Thereupon, the entire machining time can be substantially reduced.

Figure 6:
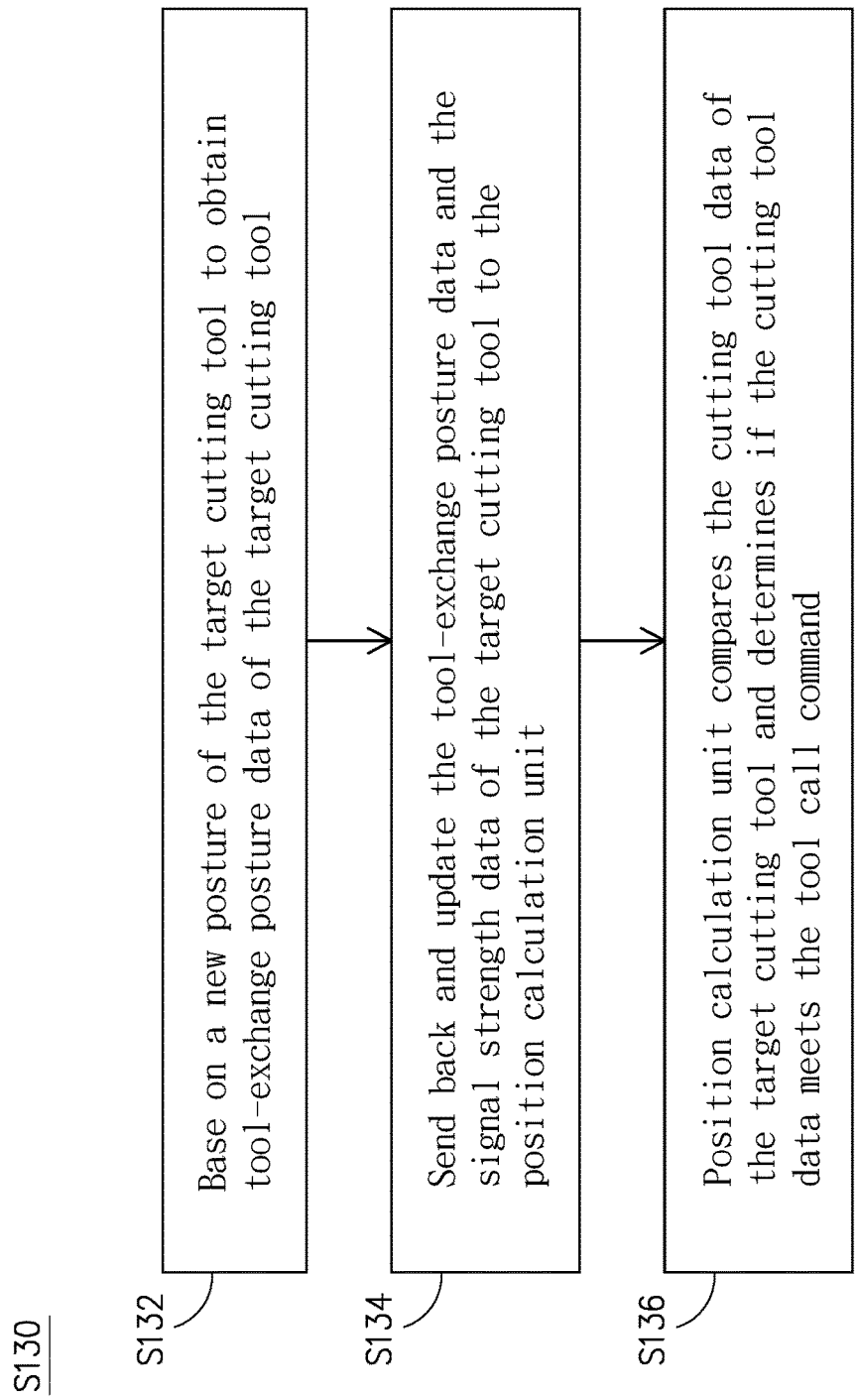
FIG. 6 is a schematic flowchart of sending a tool auto-exchange command in accordance with this disclosure.

Referring back to FIG. 1, after the target cutting tool is moved to the tool exchange position in Step S120, in Step S130, the position calculation unit 1 sends a tool auto-exchange command to the controller 3 so as to update the machining program for the tool magazine 6 to follow. The tool magazine 6 bases on the tool auto-exchange command to move the target cutting tool from the tool exchange position to a spindle of a machine 4. It shall be explained that the tool auto-exchange command herein can be an M06 command in the machining program. In detail, referring now to FIG. 6, the tool auto-exchange command of Step S130 includes Step S132 to Step S136 as follows. In Step S132, according to the newest posture of the target cutting tool posterior to the aforesaid movement, a tool-exchange posture data of the target cutting tool can be obtained. In this embodiment, the tool-exchange arm 7 would download the cutting tool 5 for the previous work order from the spindle, and then store the downloaded cutting tool 5 into a corresponding tool magazine position 61 in the tool magazine. Then, the tool-exchange arm 7 would move and mount the target cutting tool to the spindle. At the same time, according to the newest posture of the target cutting tool posterior to the aforesaid movement, a tool-exchange posture data of the target cutting tool can be obtained. In another embodiment, after the target cutting tool is mounted onto the spindle, the posture of the target cutting tool can be varied by displacing the target cutting tool on the spindle in a specific direction. In Step S134, the wireless transmission module 52 of the cutting tool 5 would feed back and also update the tool-exchange posture data and the signal strength data contained in the radio signal sent by the target cutting tool to the signal transceiver module 11 of the position calculation unit 1. In Step S136, the data calculation module 12 of the position calculation unit 1 would base on all the cutting tool data in the database unit 2 to compare and determine if or not the cutting tool data of the target cutting tool meets the tool call command. In this method, since the posture of the target cutting tool may be affected by the perturbations caused by the movement of the target cutting tool in the tool magazine 6 and on the spindle of the machine 4, thus the position calculation unit 1 can further confirm if or not the target cutting tool fulfills the tool call command by having the target cutting tool to feed back the tool-exchange posture data prior to the corresponding machining. In addition, the tool-exchange posture data fed back by the target cutting tool can also be used to compare with the posture data retrieved from the database unit 2. Thereupon, the posture of the target cutting tool can be further adjusted and compensated.

In summary, in the method for confirming cutting tool's location and the machine system using the method provided by this disclosure, the operator can perform the tool exchange simply with only the knowledge of the cutting tool for the next work order, not necessary to have the understanding of the exact storage position of the cutting tool. Hence, even the cutting tool are randomly loaded into the tool magazine, it can still locate and retrieve the target cutting tool easily from the exact cutting tool's location in the tool magazine by analyzing the posture data and the signal strength data fed back by the cutting tool itself.

Further, since the position of the cutting tool is already understood and the cutting tool has been shifted to the tool exchange position, thus it is unnecessary to rotate the tool magazine to the tool exchange position before the cutting tool is confirmed. Thereupon, the entire machining time can be substantially reduced.

In addition, regarding the tool auto-exchange command, since the posture of the target cutting tool may be affected by the perturbations caused by the movement of the target cutting tool in the tool magazine and on the spindle of the machine, thus the position calculation unit can further confirm if or not the target cutting tool fulfills the tool call command by having the target cutting tool to feed back the tool-exchange posture data prior to the corresponding machining. In addition, the tool-exchange posture data fed back by the target cutting tool can also be used to compare with the posture data retrieved from the database unit. Thereupon, the posture of the target cutting tool can be further adjusted and compensated.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for confirming cutting tool's location, applicable to a machine system, comprising the following steps of:
   a position calculation unit basing on a plurality of sleeve positions in a tool magazine of the machine system to train and obtain a training posture data and a training signal strength data of each of the plurality of sleeve positions; and
   the position calculation unit sending a tool call command to a controller of the machine system to move a target cutting tool among a plurality of cutting tool to a tool exchange position, including:
      obtaining a posture data and a signal strength data of the target cutting tool;
      basing on the posture data and the signal strength data of the target cutting tool, the position calculation unit comparing the training posture data and the training signal strength data so as to confirm a target sleeve location of the target cutting tool; and
      rotating the tool magazine by the controller to move the target cutting tool from the target sleeve location to the tool exchange position.

2. The method for confirming cutting tool's location of claim 1, wherein the step of obtaining a posture data and a signal strength data of the target cutting tool further includes:
   basing on a received signal strength of a radio signal sent by the target cutting tool to generate the signal strength data of the target cutting tool;
   basing on the signal strength data of the target cutting tool to judge if or not the target cutting tool is in the tool magazine;
   in the case that the target cutting tool is in the tool magazine, basing on an inertial sensing coordinate in a signal sent by the target cutting tool for a posture thereof to generate a corresponding initial posture data;
   rotating the tool magazine to change the posture of the target cutting tool so as to obtain a moving posture data of the target cutting tool; and
   basing on a difference between the moving posture data and the initial posture data to obtain the posture data.

3. The method for confirming cutting tool's location of claim 1, further including a step of the position calculation unit sending a tool auto-exchange command to move the target cutting tool from the tool exchange position to a spindle of a machine, the step including:
   basing on a new posture of the target cutting tool to obtain a tool-exchange posture data of the target cutting tool;
   feeding back and also updating the tool-exchange posture data and the signal strength data sent by the target cutting tool to the position calculation unit; and
   the position calculation unit comparing the target cutting tool to determine if or not the tool call command is met.

4. The method for confirming cutting tool's location of claim 3, further including a step of accessing the cutting tool data of the cutting tool, wherein the cutting tool data include codes, websites, lengths, diameters, abrasiveness and/or service life of the cutting tool.

5. The method for confirming cutting tool's location of claim 1, wherein the step to train and obtain a training posture data and a training signal strength data of each of the plurality of sleeve positions further includes a step of basing on a received signal strength of a radio signal sent by the cutting tool corresponding to the sleeve position to generate the training signal strength data of each the sleeve position.

6. The method for confirming cutting tool's location of claim 1, wherein the step to train and obtain a training posture data and a training signal strength data of each of the plurality of sleeve positions further includes a step of rotating the tool magazine and basing on an inertial sensing coordinate corresponding to the posture of the cutting tool in the respective sleeve position to generate the training posture data of each the sleeve position.

7. A machine system, comparing:
- a position calculation unit, including a signal transceiver module and a data calculation module coupled with the signal transceiver module;
- a tool magazine, having a plurality of sleeve positions, each of the plurality of sleeve positions having a cutting tool, the cutting tool communicating with the position calculation unit via radio signals; and
- a controller, connecting the tool magazine and the position calculation unit, the controller storing a machining program; wherein the position calculation unit sends a tool call command to the controller so as to update the machining program for the tool magazine to follow, and the tool magazine bases on the tool call command to move a target cutting tool among the cutting tool to a tool exchange position, further including:
  - the signal transceiver module receiving an inertial sensing coordinate and a radio signal generated by the target cutting tool, and transmitting the inertial sensing coordinate and the radio signal to the data calculation module so as to generate the posture data and the signal strength data of the target cutting tool;
  - the data calculation module basing on the posture data and the signal strength data of the target cutting tool to compare a plurality of training posture data and a plurality of training signal strength data so as to confirm a target sleeve location of the target cutting tool; and
  - rotating the tool magazine by the controller to move the target cutting tool from the target sleeve location to the tool exchange position.

8. The machine system of claim 7, further including a database unit, coupled with the position calculation unit, the signal transceiver module receiving a cutting tool data, the posture data and the signal strength data of the cutting tool, the signal transceiver module transmitting the cutting tool data, the posture data and the signal strength data of the cutting tool to the database unit, the database unit accessing the cutting tool data, the posture data and the signal strength data of the cutting tool, wherein the cutting tool data include codes, websites, lengths, diameters, abrasiveness and/or service life of the cutting tool.

9. The machine system of claim 8, wherein the data calculation module includes a training program; wherein, while the position calculation unit executes the training program, the data calculation module bases on a received signal strength of a radio signal sent by the cutting tool corresponding to the sleeve position to generate the training signal strength data of each the sleeve position, the data calculation module bases on an inertial sensing coordinate corresponding to the posture of the cutting tool in the respective sleeve position to generate the training posture data of each the sleeve position, and the signal transceiver module stores the training signal strength data and the training posture data to the database unit; wherein, while the position calculation unit sends the tool call command, the signal transceiver module retrieves the training signal strength data and the training posture data in the database unit further to the data calculation module.

10. The machine system of claim 8, wherein the position calculation unit sends a tool auto-exchange command to the controller so as to update the machining program for the tool magazine to follow, the tool magazine bases on the tool auto-exchange command to move the target cutting tool from the tool exchange position to a spindle, including the steps of:
- basing on a new posture of the target cutting tool to obtain a tool-exchange posture data of the target cutting tool;
- feeding back and also updating the tool-exchange posture data and the signal strength data sent by the target cutting tool to the position calculation unit; and
- the position calculation unit comparing the target cutting tool to determine if or not the tool call command is met.

* * * * *